Patented May 12, 1953

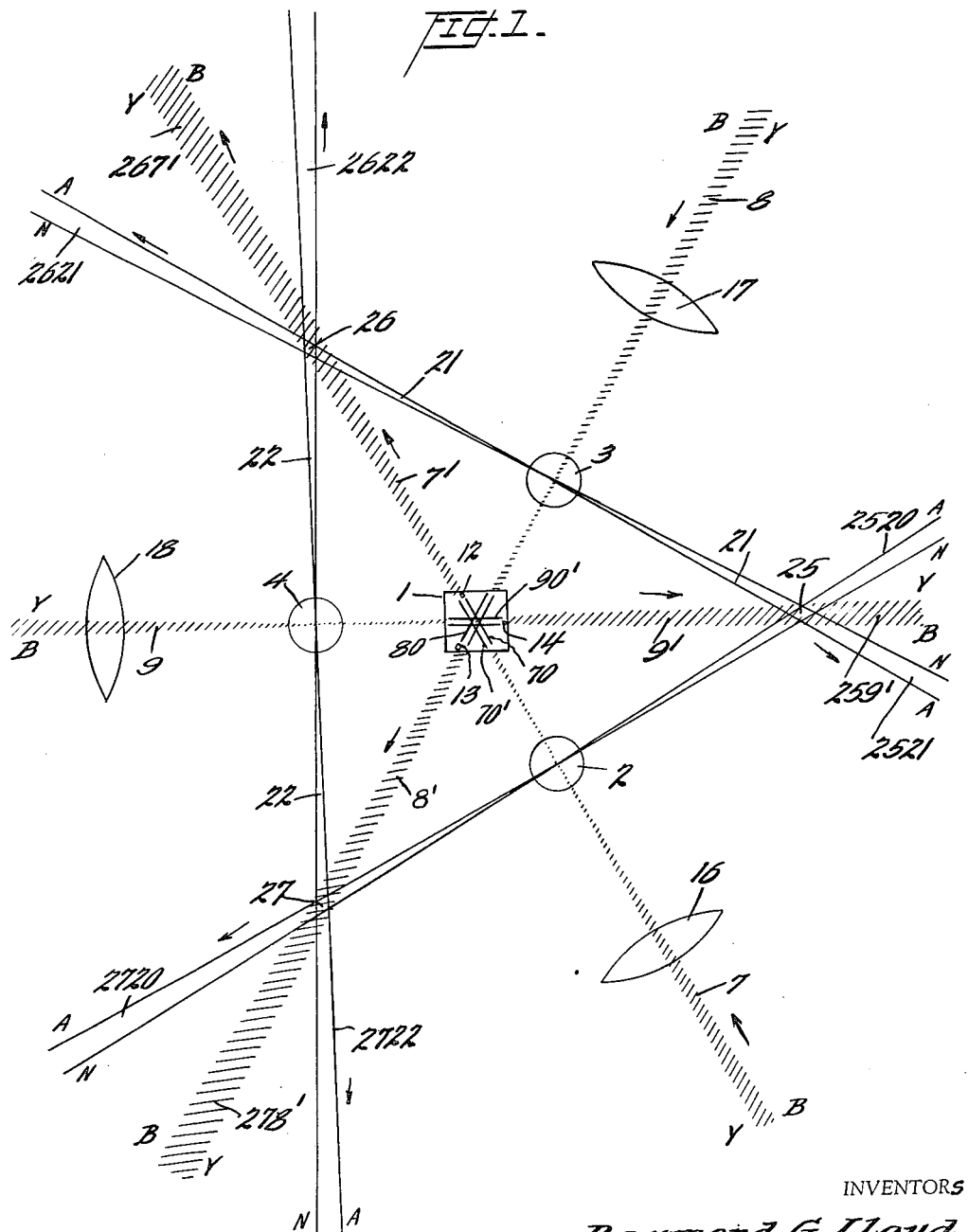

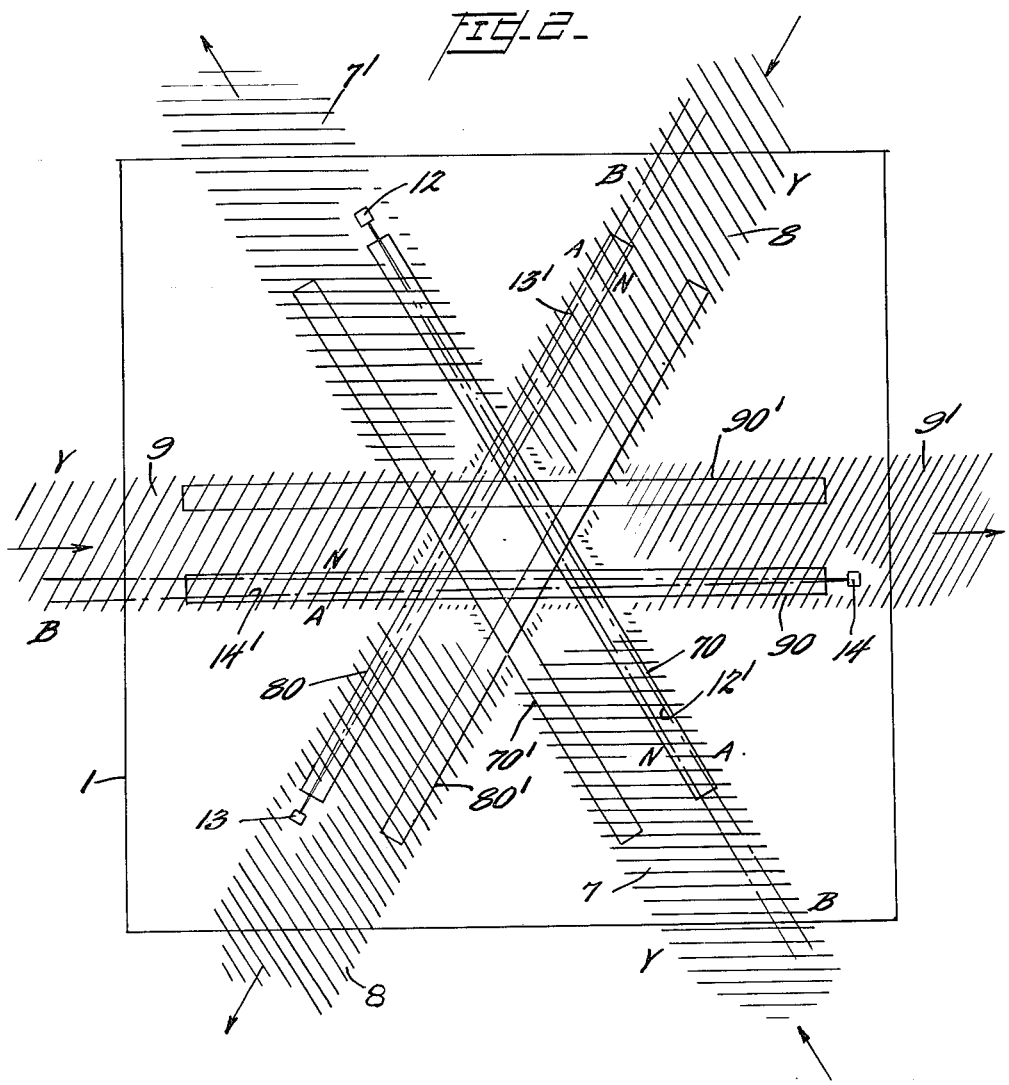

2,638,589

UNITED STATES PATENT OFFICE 2,638,589

SYSTEM OF RADIO AIDS FOR AERIAL NAVIGATION IN THE VICINITY OF AIRPORTS

Raymond G. Lloyd, La Grange Park, Ill., and Walter H. Young, Bethesda, Md.

Application June 12, 1950, Serial No. 167,554

4 Claims. (Cl. 343—107)

1

This invention relates to systems and arrangements of radio aids for aerial navigation in the vicinity of airports, and of the runways of airports, and has for an object to provide for greater safety of the aircraft in approaching and landing, and in departing from airports.

A further object of the invention is to increase the capacity of airports for receiving and dispatching aircraft, especially in times of poor visibility, while reducing or minimizing the hazard of possible collision between aircraft in the vicinity of an airport when operating under the control pattern of this system or arrangement of radio aids, and of the runways.

Another object of the invention is to provide a system or arrangement of radio aids for control of aerial navigation in the vicinity of airports which is of great simplicity and which will permit the aircraft approaching the airport for landing to proceed directly to the airport from any of a plurality of directions without being required to make any appreciable changes of direction or reversals of direction after coming into the portion of the system which provides the aircraft navigator with definite information as to his exact position when about to make a direct approach for landing.

A further study of the invention is to provide a plurality of clear, unobstructed, outbound courses, so far as air traffic is concerned, for departure both for craft taking off from the airport, and for craft, which, for various reasons, after having approached for landing, are not able to land and are required to continue flight. The first parts of said outbound courses are directly in alignment with and extend in the same general directions as the respective inbound courses, so that craft which are required to continue flight after passing over the airport in an attempt to land have available a clear outbound course ahead without having to change direction.

Another object of this invention is to provide a system or arrangement of radio aids which increases safety of aircraft departing from an airport by the provision of a plurality of definite divergent courses, that is, diverging from definite positions spaced a comparatively short distance from the airport, whereby a greater number of aircraft can be permitted to depart within a certain length of time without liability of collision.

A further object of this invention is to provide a system or arrangement of radio aids for airports, which system has a definite pattern for rapid dispersion of the aircraft so as to reduce liability of collision, even with larger numbers

2 of aircraft departing, that is, at shorter time intervals.

Other objects and advantages of the invention will be apparent from the following specification, drawings, and claims.

In the accompanying drawings Figure 1 is a diagrammatic representation of an airport and its general vicinity with the radio aids, including range beams diagrammatically represented. Figure 2 is an enlarged scale representation of the airport and immediate vicinity with parts of the range beams omitted for the sake of clarity of representation of other features. In the drawing the airport field is indicated by numeral 1. The field is represented as square but its actual shape is not material to this invention. The airport is the center of the system or arrangement of radio aids which, together with the arrangement of the runways, constitutes the present invention. Located at three approximately equidistant points from the airport and arranged at substantially equal angles apart, relative to the airport, are three double directional beam range stations 2, 3 and 4 respectively. These range stations are located at about 120° apart relative to the airport, considered as an approximate center, and each of these range stations emit radio-signal beams represented as being approximately at right angles to each other, one passing across the airport and the other, substantially, at right angles to the first beam. The two beams of each range station should have different frequencies. Preferably the beams are of very high frequency, say of the order of between 30 and 300 megacycles. By way of example each of the beams of each station which pass across the airport are assumed to be visually receivable in the aircraft and therefore are represented by cross hatching and the approach courses provided thereby are indicated individually by reference numerals 7, 8 and 9 respectively. The visual receiving mechanism which could be employed is conventional and does not form, per se, a part of the present invention. Such a mechanism may be comprised by means indicating the color blue if the aircraft is off-course to the right and the color yellow if off-course to the left. Hence the letters B and Y on the drawings indicate the colors blue and yellow on the appropriate edges of the courses 7, 8, and 9. The beams providing these courses should be of slightly different frequencies from each other, for example, 109.1, 110.1 and 111.1 megacycles, respectively. The continuations of these beams beyond the airport, provide departure courses designated 7′, 8′, and 9′ for aircraft departing from the airport and for any aircraft which are required to continue flight after an unsuccessful attempt to land.

As previously stated each of the range stations broadcasts two beams substantially at right angles to each other. The beams which extend transversely of those which cross the airport are represented as being audibly receivable and are designated by numerals 20, 21 and 22 in the drawings. Such beams are known, per se, and do not individually constitute this invention.

When following such a beam an aircraft navigator would receive a continuous hum when on course, a dot-dash signal (Morse code letter A), when off course to the right, and a dash-dot signal (Morse code letter N), if off course to the left. The signals providing beams 20, 21 and 22 are preferably of very high frequency and are slightly different frequencies from each other, and from the frequencies of the beams of courses 7, 8, and 9.

Furthermore, the airport is, preferably, provided with a plurality of directional-beam, localizer radio stations which are located, respectively, on the opposite sides of the airport from the range stations 2, 3, and 4. These localizer stations, indicated by reference numerals 12, 13, and 14, broadcast directional beams of different frequencies, in the direction of the respective range station, 2, 3, or 4, from which each is oppositely located. The directional beams emitted thereby are indicated, respectively, by 12', 13' and 14', and are, preferably, audibly receivable and comprised by the dot-dash of letter A in one oversized semicircular sector and dash-dot letter N in the opposite sector with the beam itself indicated by a steady hum. The approach courses 7, 8 and 9 are, preferably, provided with various approach control signals such as fan markers 16, 17, and 18, which are customarily employed in conjunction with known approach courses, and do not, per se, constitute the present invention.

By reason of the definite, systematic, or geometric arrangement of the double directional beams of the range stations 2, 3 and 4, there are provided three relatively small areas of intersection which for purposes of explanation may be regarded as intersectional points referred to in the drawing by numerals 25, 26 and 27. These intersectional areas or points can be regarded as points of dispersion, that is, points from which aircraft departing from the airport on the departure portions 7', 8', or 9' of beams 7, 8, or 9, may, according to instructions from the overall control authority of the airport take any designated one of three available outbound courses from each dispersion point, in order to obtain lateral separation from any other aircraft which may have recently departed from the airport on the same one of the beams 7', 8' or 9'.

Thus from beam intersectional, or dispersion, point 25, there are three divergent courses constituted by extensions of beam courses 21, 9' and 20. These divergent courses are referred to in the drawing, by reference characters 2520, 259', and 2521 respectively. Similarly beam intersectional or dispersion point 26 has three divergent courses referred to as 2621, 267', and 2622, and likewise intersectional point 27 has three divergent departure courses referred to as 2720, 278', and 2722.

Upon departing from the airport on any one of the departure beams 7', 8', or 9', an aircraft should proceed to the respective intersectional, or dispersion, point lying straight ahead where it would then follow instructions from control authority as to which of the respective divergent outbound courses to follow in order to gain lateral separation from any other craft departing from the same course either closely before or after its departure. In order to further increase the capacity of the airport and more fully utilize its facilities the airport should, preferably, be provided with three sets of parallel runways arranged in a triangular design. Each set may comprise an approach runway which should be exactly in alignment with its respective localizer beam while the departure runway may lie approximately parallel to and laterally spaced from the approach runway of its pair. By this arrangement aircraft using the runways of each pair whether landing or departing always move in the same direction with approaching and departing craft always on different runways and thus never cross each others paths. In the drawing the runway for approach course 7 is indicated by numeral 70 while departure runway for departure course 7' is indicated by 70'; landing and departure runways for courses 8 and 8' by numerals 80, and 80', respectively; and landing and departure runways for courses 9 and 9' by numerals 90 and 90', respectively.

As previously stated the system or arrangement of radio aids also provides for great safety for aircraft which, having approached for landing are unable to land, in that the departure portion of the beam by which it has approached lies directly ahead and in direct alignment with the course it is following. Assuming, for example, that an aircraft has approached on one of the approach courses provided by the range stations and has passed inward of the range station and the operator has switched the radio reception to the appropriate localizer beam and the said localizer station should get out of order and no longer broadcast the beam, then the operator could switch his radio back to receive the beam of the range station by which he had made his approach. The departure portion of said beam lies directly ahead and is free of any cross traffic and therefore the craft may continue flight directly ahead until control instructions are received from the control authorities of the airport.

Preferably the system should be operated with a systematic sequence of operations so as to be sure that the aircraft will not cross paths. For example a craft approaching on course seven could be authorized to continue its approach and to land. As soon as it had made contact with the ground a craft waiting on departure runway 70' could be authorized to depart. As soon as the departing craft had gained sufficient distance from the airport, a craft approaching on course eight could be authorized to land and as soon as its landing was assured a craft waiting to depart on departure runway 80' could be authorized to depart. Next a similar operation on courses 9 and 9' and runways 90 and 90' would be carried out. Let it be assumed however in the above described operations that the craft which had approached for landing on course 8 had not been able to land, then it could continue flight straight ahead on course 8' lying directly ahead and, it would only be necessary to withhold authority for the departure of the aircraft waiting on runway 80', in order to provide complete safety against collision of the craft continuing flight with all other aircraft operating under the control authority of the airport.

We claim:

1. In radio control systems for landing and dispatching aircraft, an airport having three elongated runways arranged at substantially equal angles to each other respectively, three double directional beam radio range stations located at substantially equal distances from the airport and each being in a position in substantial elongation of one of the respective runways, one of the beams of each station being directed so as to cross the airport thus providing navigational courses directed directly toward the airport for approach for landing, and also providing elongational courses for departure, each approach and departure course, angularly considered, being entirely clear of all of the other said courses, provided by said range stations, outside the limits of the airport.

2. In systems of radio aids for control of landing and dispatching of aircraft at airports, an airport, three double directional beam radio range stations located substantially equidistant from the airport and substantially equiangularly disposed with respect thereto, one of the beams of each said range station being directed substantially toward and away from the airport and the second beam of each station being directed substantially at right angles to the first other beam of the respective station.

3. In systems of radio aids for airports for assisting approach for landing and for departure of aircraft, three double directional beam radio range stations located at substantially equal distances from the airport and at substantially equiangular disposition relative to the airport, one beam of each range station being directed toward and away from the airport and the other beam being directed substantially at right angles to the respective first mentioned beams, thus providing three approach channels or courses directed toward the airport with substantially equiangular spacing and three departure courses or channels in elongation of the approach courses, whereby approaching aircraft may approach the airport for landing from any of three directions on unobstructed courses, and departing aircraft may depart on any of three courses which are unobstructed outside the limits of the airport, and also whereby any aircraft which, having approach to the airport for landing and are unable to land have a clear departure course directly ahead.

4. In systems of radio aids for aircraft navigational control in the vicinity of airports, three double directional beam radio range stations located substantially equidistant from and substantially equiangularly disposed with respect to the airport, the beams of each of said range stations being directed substantially at right angles to each other, and one of the beams of each station being directed substantially toward and away from the airport, the beams of said stations having intersections substantially at three locations spaced from the airport and providing, outwardly beyond the said intersections, three dispersional beams or courses for aircraft departing at close time intervals in the same general direction.

RAYMOND G. LLOYD.
WALTER H. YOUNG.

References Cited in the file of this patent

UNITED STATES PATENTS

| Number | Name | Date |
| --- | --- | --- |
| 2,179,499 | Diamond | Nov. 14, 1939 |
| 2,525,815 | Lloyd | Oct. 17, 1950 |